(12) United States Patent
Bower

(10) Patent No.: US 7,757,806 B2
(45) Date of Patent: Jul. 20, 2010

(54) ADJUSTABLE OPERATOR INTERFACE

(75) Inventor: Robert M. Bower, Raleigh, NC (US)

(73) Assignee: Caterpillar SARL, Geneva (CH)

( * ) Notice: Subject to any disclaimer, the term of this patent is extended or adjusted under 35 U.S.C. 154(b) by 987 days.

(21) Appl. No.: 11/315,109

(22) Filed: Dec. 22, 2005

(65) Prior Publication Data
US 2007/0145805 A1    Jun. 28, 2007

(51) Int. Cl.
*B60K 26/00* (2006.01)
(52) U.S. Cl. .................................................. 180/326
(58) Field of Classification Search ............... 180/326, 180/329; 297/115, 116, 162, 411.2, 411.23, 297/411.31, 411.33; 248/284.1
See application file for complete search history.

(56) References Cited

U.S. PATENT DOCUMENTS

| | | | |
|---|---|---|---|
| 3,580,636 | A | 5/1971 | Setto |
| 3,899,042 | A * | 8/1975 | Bonar ......................... 297/487 |
| 4,012,014 | A | 3/1977 | Marshall |
| 4,478,308 | A | 10/1984 | Klaassen |
| 4,702,520 | A | 10/1987 | Whisler et al. |
| 4,997,054 | A | 3/1991 | Denny et al. |
| 5,026,118 | A * | 6/1991 | Vander Stel et al. ......... 297/338 |
| 5,129,478 | A * | 7/1992 | Suenaga et al. ............. 180/268 |
| 5,359,737 | A * | 11/1994 | Hodge ........................... 4/483 |
| 5,379,663 | A | 1/1995 | Hara |
| 5,383,532 | A * | 1/1995 | Shonai et al. ............... 180/269 |
| 5,566,778 | A | 10/1996 | Valier et al. |
| 5,666,861 | A | 9/1997 | Fee et al. |
| 5,730,458 | A * | 3/1998 | Byon ....................... 280/730.2 |
| 5,924,515 | A | 7/1999 | Stauffer |
| 5,931,254 | A * | 8/1999 | Loraas et al. ............... 180/272 |
| 5,984,040 | A * | 11/1999 | Lee ............................ 180/271 |
| 6,164,285 | A * | 12/2000 | Garberg et al. ............. 180/326 |
| D437,327 | S * | 2/2001 | Bares et al. .................. D15/28 |
| 6,182,781 | B1 * | 2/2001 | Beom ......................... 180/271 |
| 6,186,260 | B1 | 2/2001 | Schenck et al. |
| 6,202,501 | B1 | 3/2001 | Ikari |
| 6,299,207 | B1 * | 10/2001 | Bares ......................... 280/748 |
| 6,406,097 | B1 | 6/2002 | McIlwain et al. |
| 6,481,520 | B2 * | 11/2002 | McIlwain et al. ......... 180/89.12 |
| 6,557,893 | B2 * | 5/2003 | Sauermann ................. 280/748 |
| 6,598,935 | B2 | 7/2003 | Colliar et al. |
| 6,634,453 | B2 | 10/2003 | Arthur et al. |
| 6,646,891 | B2 | 11/2003 | Kim |
| 6,702,373 | B2 | 3/2004 | Rossko |
| 6,732,829 | B2 * | 5/2004 | Bares ......................... 180/271 |
| 6,752,422 | B2 * | 6/2004 | Sauermann ................. 280/748 |
| 6,898,496 | B2 | 5/2005 | Chernoff et al. |

(Continued)

FOREIGN PATENT DOCUMENTS

JP      04283143 A  * 10/1992

(Continued)

*Primary Examiner*—Faye M. Fleming
(74) *Attorney, Agent, or Firm*—William A. Beckman

(57) ABSTRACT

An adjustable operator interface for a work machine is provided. The adjustable operator interface has an operator compartment with a forward direction, and includes a seat, a mounting plate, an armrest and an armbar. The seat is secured within the operator compartment. The mounting plate is also secured within the operator compartment. The armbar bracket is slidably disposed along the forward direction on the mounting plate. The armbar is pivotally attached to the armbar bracket.

24 Claims, 5 Drawing Sheets

U.S. PATENT DOCUMENTS

| | | | |
|---|---|---|---|
| 6,902,024 B2 * | 6/2005 | Müller et al. | 180/271 |
| 7,401,851 B2 * | 7/2008 | Plavetich et al. | 297/216.12 |
| 2002/0145325 A1 | 10/2002 | Clevenger | |
| 2002/0195868 A1 * | 12/2002 | Tsai | 297/487 |
| 2003/0094843 A1 * | 5/2003 | Jensen et al. | 297/391 |
| 2003/0127268 A1 * | 7/2003 | Bares | 180/268 |
| 2005/0102865 A1 | 5/2005 | Bell et al. | |

FOREIGN PATENT DOCUMENTS

| | | | |
|---|---|---|---|
| JP | 04289332 A | * | 10/1992 |
| JP | 07002055 A | * | 1/1995 |

* cited by examiner

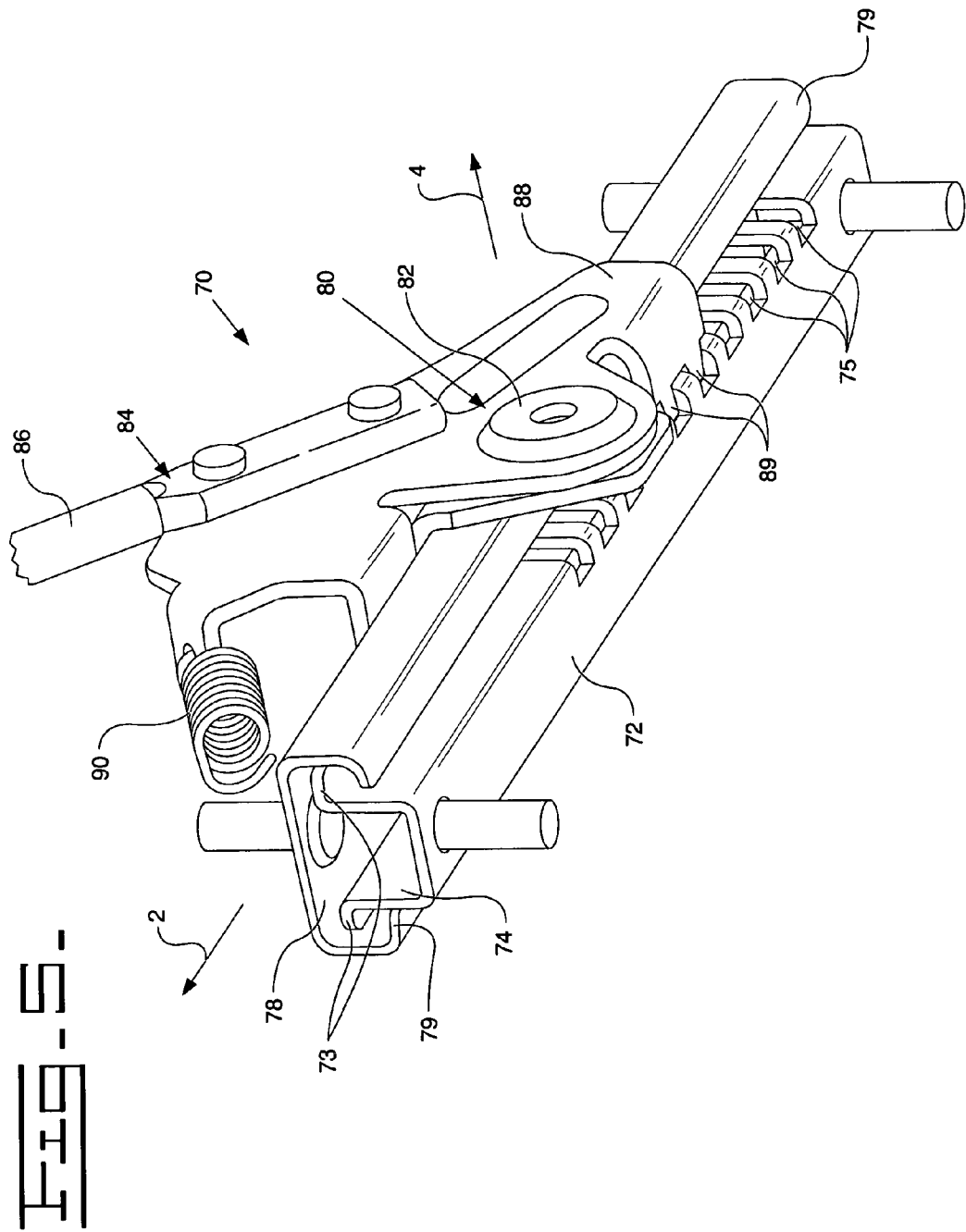

US 7,757,806 B2

ADJUSTABLE OPERATOR INTERFACE

TECHNICAL FIELD

This invention relates generally to an adjustable operator interface and, more particularly, to an adjustable armrest assembly for a work machine such as a skid steer loader.

BACKGROUND

Work machines, such as skid steer loaders, multi terrain loaders, backhoe loaders, agricultural tractors, track-type tractors, articulated trucks, wheel loaders, and other types of construction, mining, or agricultural machinery are used for a variety of tasks requiring operator control. Typically, an operator controls these machines through an interface. Due to the jostling of the machine as it travels over rough terrain and the long hours that an operator can expect to remain in the machine, operator compartments typically have adjustable operator interfaces. These operator interfaces have adjusting mechanisms that include ergonomically adjustable seats, armrests, and control levers.

For skid steer loaders, multi terrain loaders, and other compact work machines, the operator compartment may include rollover protection, falling-object protection, and seat belts. These components result in a compact seating area with limited access through the front of the machine. Adjusting mechanisms that allow for ergonomic positioning of the operator interface may hamper entry and exit from the operator compartment.

One example of an adjustable operator interface that attempts to address this is disclosed in U.S. Patent Application No. 2002/0145325 to Clevenger ("Clevenger"). Clevenger discloses an armrest structure for a skid steer loader. The operator compartment or cab includes two control levers that are fixed to the floor. A seat, mounted along slides, may move fore and aft parallel to the direction of vehicle travel. Left and right armrests are pivotally attached to the cab walls. The armrests may be rotated upward transverse to a direction of vehicle travel as an operator enters and exits. The armrests may be adjusted up or down to one of three vertical positions.

While the operator interface in Clevenger is adjustable, the control levers are not. For pilot controlled hydraulics, this is a typical arrangement. In such cases, due to the hydraulic lines that extend from the hydraulic system to the controls, the control levers are typically fixed with respect to the cab floor. As a result, the seat must be adjusted relative to the control levers, typically requiring an operator to awkwardly reach for the bottom of the seat and engage a slide mechanism. The fixed control levers also may hamper entry and exit from the operator compartment.

Operator interfaces having moveable control levers have been disclosed. For example, U.S. Pat. No. 4,702,520 to Whisler ("Whisler") discloses an adjustable armrest with integral vehicle controls. However, Whisler requires that an operator awkwardly reach to the sides and rear of the armrests to make any adjustments. Further, Whisler lacks an armbar that wraps around the seated operator.

The present invention is directed to overcome one or more of the problems as set forth above.

SUMMARY OF THE INVENTION

In one aspect of the present invention, an adjustable operator interface for a work machine is provided. The adjustable operator interface has an operator compartment with a forward direction, and includes a seat, a mounting plate, an armbar bracket and an armbar. The seat is secured within the operator compartment. The mounting plate is also secured within the operator compartment. The armbar bracket is slidably disposed along the forward direction on the mounting plate. The armbar is pivotally attached to the armbar bracket.

In another aspect of the present invention, a skid steer loader is provided. The skid steer loader has an operator compartment with a forward direction, and includes a seat, a mounting plate, an armbar bracket and an armbar. The seat is secured within the operator compartment. The mounting plate is also secured within the operator compartment. The armbar bracket is slidably disposed along the forward direction on the mounting plate. The armbar is pivotally attached to the armbar bracket.

A third aspect of the present invention includes a method of providing an adjustable operator interface. The method includes the step of providing a work machine having an operator compartment. The method also includes the steps of securing a seat within the operator compartment and securing a mounting plate adjacent the seat and within the operator compartment. The method includes the step of slidably mounting an armbar bracket on the mounting plate. The method also includes the step of pivotally attaching an armbar to the armbar bracket.

BRIEF DESCRIPTION OF THE DRAWINGS

FIG. 5 is a perspective view of the slide assembly of FIG. 2.

DETAILED DESCRIPTION

Figure 1:
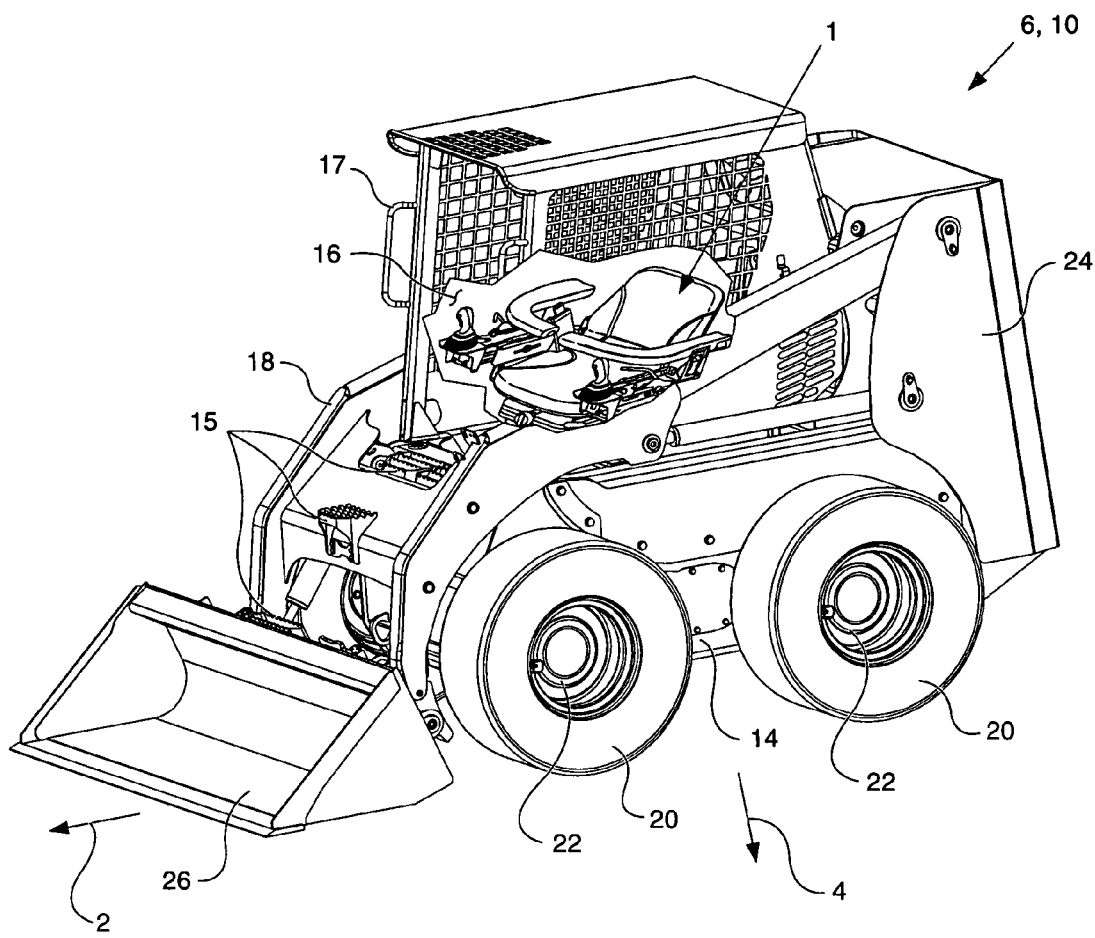
FIG. 1 is a diagrammatic illustration of a work machine suitable for use with the present invention with portions cut away to illustrate the adjustable operator interface.

A work machine 6 such as a skid steer loader 10 in accordance with the present invention is illustrated in FIG. 1. As shown, the skid steer loader 10 includes a body portion 14, steps 15, an operator compartment 16, a handle 17, and a lift arm assembly 18. Front and rear sets of wheels 20 are mounted to stub axles 22 that extend from each side of the body portion 14. The lift arm assembly 18 is pivotally mounted to laterally spaced side members or uprights 24 at the rear of the body portion 14 and pivotally carries a bucket or other implement 26. It should be recognized that the skid steer loader 10 could be belt/track driven or could have a belt entrained around front and rear wheels 20.

Figure 2:
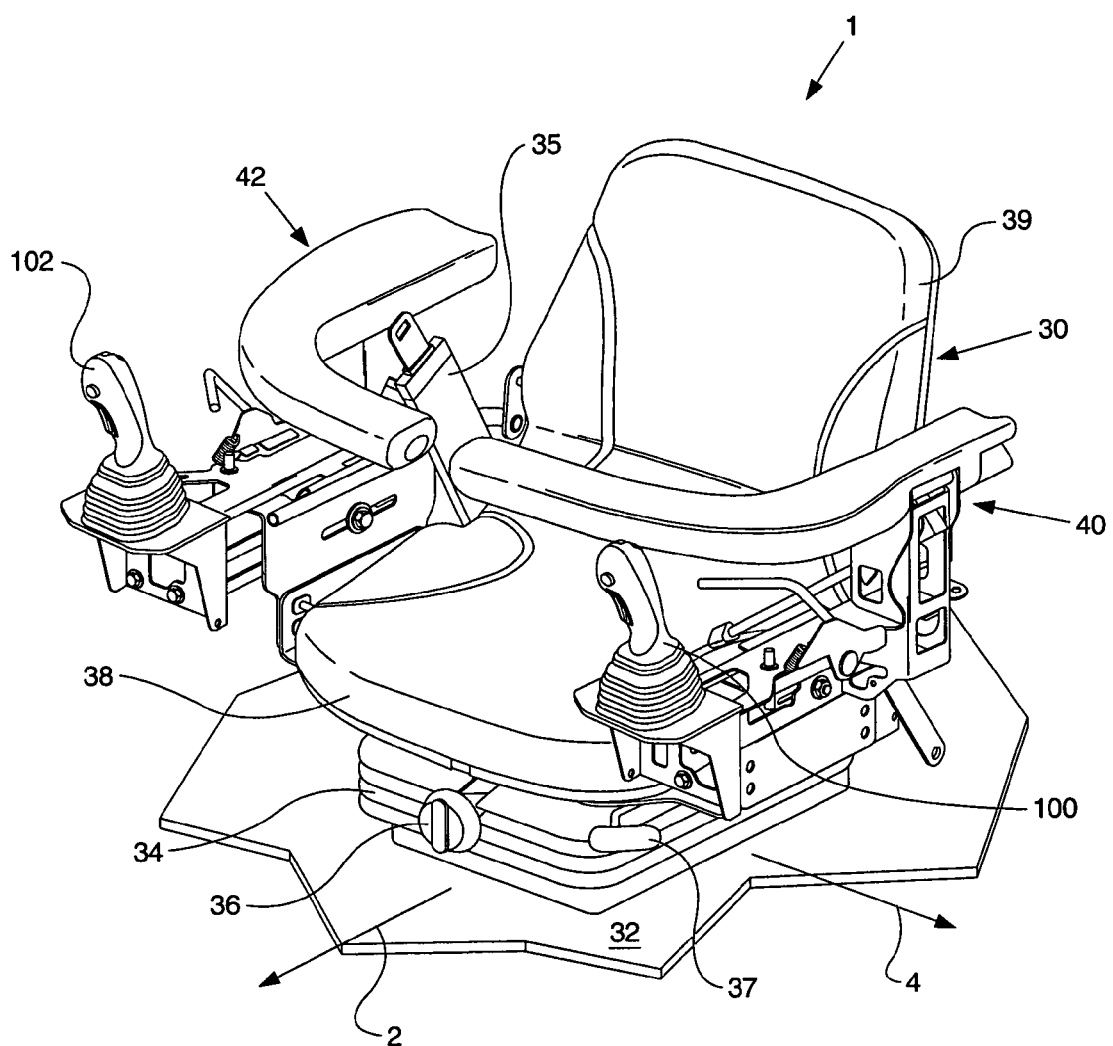
FIG. 2 is a perspective view of the adjustable operator interface of FIG. 1.

As seen in FIG. 2, the operator compartment 16 includes an adjustable operator interface 1 including a vehicle operator seat 30 having a first and second armrest assembly 40, 42 and a left and a right control lever 100, 102. The left and right control levers 100, 102 control the respective motors (not shown) for the wheels 20 of the skid steer loader 10. Armrest assembly 40 is a mirror image of armrest assembly 42, with armrest assembly 40 for an operator's left arm, and armrest assembly 42 for an operator's right arm. Therefore, for purposes of clarity, only armrest assembly 40 will be described in detail.

As seen in FIG. 2, the vehicle operator seat 30 is mounted to a floor 32 in the operator compartment 16. The vehicle operator seat 30 may also incorporate a suspension system 34 that damps and absorbs vibrations and shocks. An adjustment knob 36 may adjust the spring rate of the suspension system 34, while a lever 37 adjusts the position of the seat 30 fore and aft along a forward direction 2. The vehicle operator seat may also include a seat-height adjustment mechanism (not shown). Alternately, the vehicle operator seat 30 may be fixedly mounted to the floor 32, such that the seat 30 does not move with respect to the floor 32 in either the forward direction 2 or a transverse direction 4. The forward direction 2 and the transverse direction 4 may be rotated without departing from the present invention. The vehicle operator seat 30 includes a seat base 38 and a seat back 39 extending from the seat base 38. The seat base 38 and the seat back 39 may be integrally formed, or may be a multi-piece assembly. The vehicle operator seat 30 may also incorporate a seat belt 35 to secure an operator in the seat 30, and an operator presence switch (not shown) that engages or disengages the transmission, parking brake, or engine depending on whether an operator is sitting in seat 30 or not.

Figure 3:
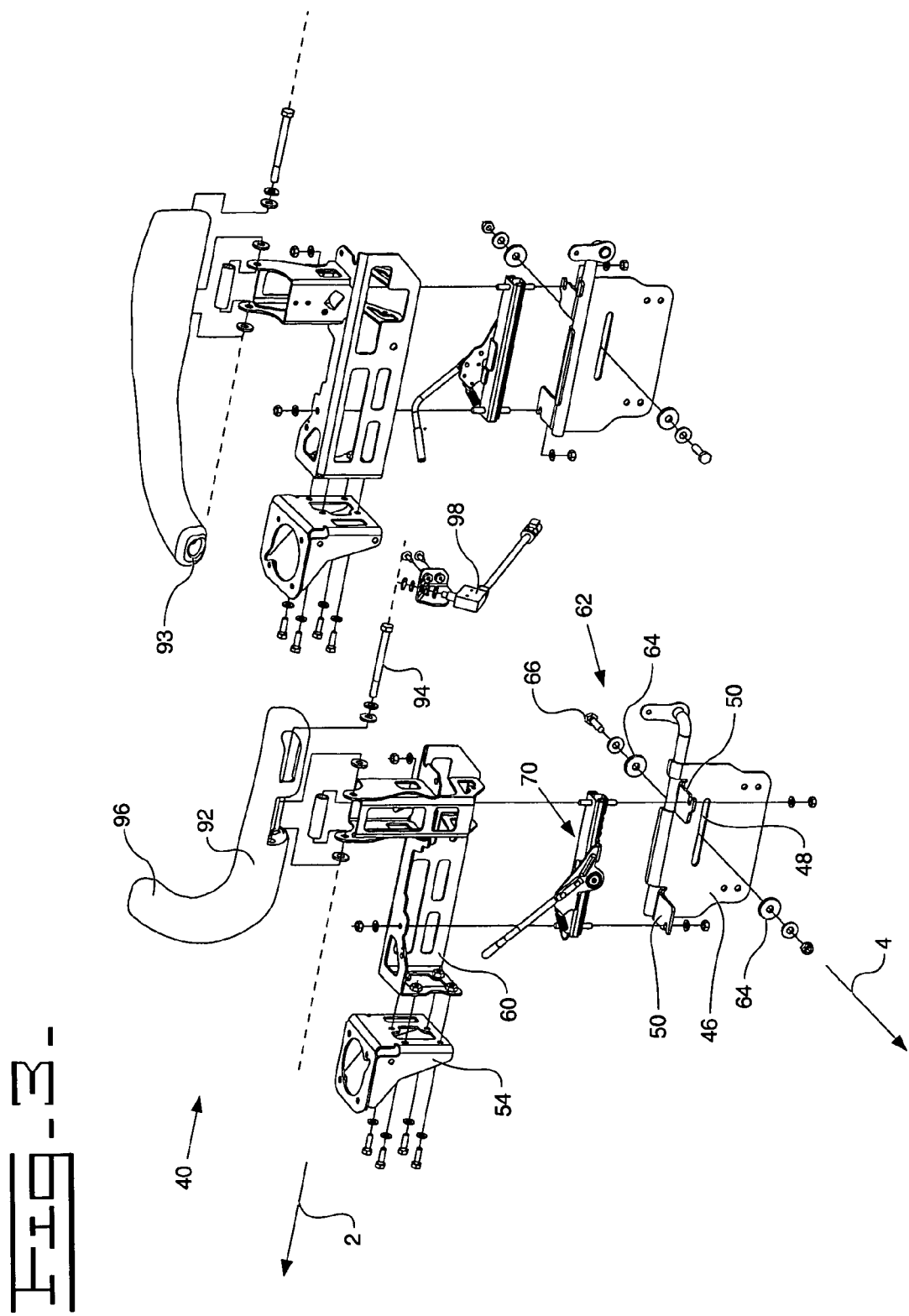
FIG. 3 is an exploded perspective view of the armrest assemblies of FIG. 2.

As seen in FIGS. 2-3, the armrest assembly 40 includes a mounting plate 46, a joystick bracket 54, an armbar bracket 60, a slide assembly 70, an armbar 92, and an armbar switch 98. The mounting plate 46 may be fixedly mounted to the vehicle operator seat 30, such that it is secured to both the seat base 38 and the seat back 39. Alternately, the mounting plate 46 may be mounted to the floor 32 or the sidewalls (not shown) of the operator compartment 16, such that the seat 30 and the mounting plate 38 may move independently of each other. A slot 48, formed in the mounting plate 46, extends in a direction parallel to the forward direction 2. Alternately, the slot 48 may extend diagonally, along a curve, or with other path in the mounting plate 46. The mounting plate 46 also includes a plurality of flanges 50 that extend in the transverse direction 4. The mounting plate 46 may be an integral piece, or formed as a multi-piece assembly.

The armbar bracket 60 is slidably attached to the mounting plate 46. A rod assembly 62 is mounted to the armbar bracket 60. The rod assembly 62, which includes two slide washers 64 mounted on a bolt 66, extends through the slot 48 in the mounting plate 46. The slide washers 64 are disposed on either side of the mounting plate 46. The armbar bracket 60 slides fore and aft along the forward direction 2 with respect to the mounting plate 46 as the bolt 66 travels in the slot 48. The rod assembly 62 may also include lubricated bearings (not shown) to reduce the friction as the rod assembly 62 slides along the slot 48.

Figure 4:
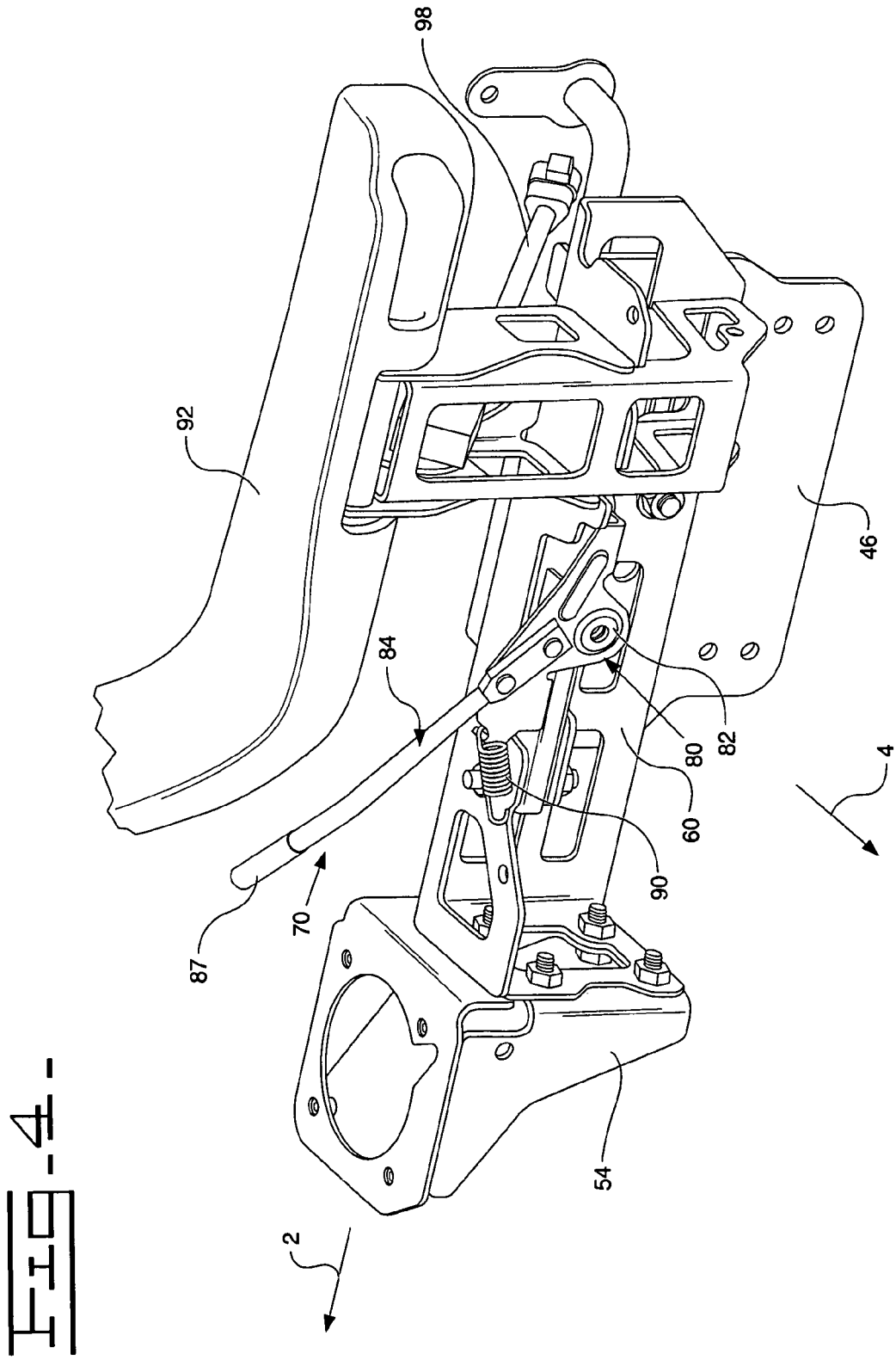
FIG. 4 is a perspective view of the armrest assembly of FIG. 2.

As shown in FIGS. 2-4, a joystick bracket 54 may be mounted to the armbar bracket 60, with the control lever 100 mounted to the joystick bracket 54.

As seen in FIGS. 4-5, the slide assembly 70 includes a fixed bracket 72, a sliding bracket 78, and a pivot assembly 80. The fixed bracket 72 is attached to the flanges 50 of the mounting plate 46, and is formed as a U-shaped bracket having transverse flanges 73 that extend from the sidewalls 74 of the bracket 72. A plurality of slots 75 are formed in the sidewall 74. The slots 75 extend vertically along the sidewall 74.

The sliding bracket 78 is attached to the armbar bracket 60 and is formed as a C-shaped bracket having flanges 79. As shown in FIG. 5, the sliding bracket 78 is slidably disposed along the fixed bracket 72 along the forward direction 2. Lubricated inserts (not shown) may be placed at any frictional interface between the sliding bracket 78 and the fixed bracket 72.

The pivot assembly 80 is mounted to the sliding bracket 78, and includes a pivot 82, a pivot arm 84, and a spring 90. The pivot arm 84 is rotatably mounted to sliding bracket 78 about the pivot 82, which extends in the transverse direction 84. The pivot arm 84 has a handle end 86 and a locking end 88. The handle end 86 is angled, such that it has a projection 87 that conforms to the curve of the armbar 92. The projection 87 may also be rubber-coated. The locking end 88 includes a plurality of teeth 89 that project in a transverse direction 4. The teeth 89 are shaped to interlock with the slots 75 in the sidewall 74 of the fixed bracket 72. The spring 90 is mounted to the sliding bracket 78 and the pivot assembly 80. The spring 90 biases the handle end 86 downward, so that the teeth 89 remain engaged with the slots 75. By pulling the handle end 86 upwards, the pivot arm 84 rotates about the pivot 82 and disengages the teeth 89 from the slots 75, allowing the sliding bracket 78 and the armbar bracket 60 to move with respect to the fixed bracket 72 and the mounting plate 46 in a fore and aft direction with respect to the forward direction 2.

Referring now to FIGS. 2-4, the armbar 92 is rotatably mounted to the armbar bracket 60 along an armbar pivot 94. As seen in FIG. 3, armbar 92 may be cushioned and include a core 93 made out steel, graphite, or some other metal, plastic, or composite material. Armbar 92 is L-shaped, having a wrap-around portion 96 that extends in front of an operator. This wrap-around portion 96 may provide an operator with a perceived sense of security in the event of a seatbelt failure. The armbar 92 rotatably pivots about the armbar pivot 94, such that the wrap-around portion 96 rotates about an axis parallel to the forward direction of travel 2 and may move up and out of the way of an operator as the operator enters or exits the machine. The armbar 92 may include a rotatable stop (not shown), such that the armbar 92 is limited to ninety degrees of travel about the armbar pivot 94, and may rest in an upward position.

The armbar switch 98 may be mounted to the armbar 92 and the armbar bracket 60, such that it switches on and off as the armbar 92 is rotated up or down about the armbar pivot 94. The switch may be electrically coupled to a control unit (not shown) that engages or disengages the transmission, parking brake, or engine depending on whether the armbar 92 is rotated up or down.

INDUSTRIAL APPLICABILITY

In operation, an operator may enter the operator compartment or cab 16 by climbing on steps 15 mounted on the skid steer loader, and using a handle 17. When the operator enters the compartment 16, the operator must turn around to sit in the seat 30 and fasten seat belt 35. The operator may change the spring rate of the suspension system 34 by turning the adjustment knob 36, and may move the seat 30 fore or aft along the forward direction 2 by releasing the lever 37. The operator may rotate the armbars 92 downward about the armbar pivot 94, activating the armbar switch 98 to disengage the parking brake. The operator may adjust the position of the armbars 92 fore and aft by grasping the projections 87 of the pivot arm 84 of the slide assembly 70. By pulling the projection 87 upwards, the teeth 89 at the locking end 88 of the pivot arm 84 rotate about the pivot 82 and disengage from the slots 75 on the fixed bracket. This allows the armbar bracket 60 to slide fore and aft with respect to the forward direction 2 along the mounting plate 46.

When an operator moves the armrest assemblies 40, 42 to a suitable position to support his arms when operating control levers 100, 102, the operator releases the projection 87. The spring 90 pulls the handle end 86 downward about the pivot 82, pulling the teeth 89 into engagement with the slots 75 to lock the slide assembly 70.

To exit the machine, an operator may grasp the projections 87 and pull them upwards, which releases the slide assembly 70 as described above. The operator may then pull the armrest assemblies 40, 42 back towards the seat back 38, release the projections 87 to lock the slide assembly 70, and rotate the armbars 92 upwards. This moves the control levers 100, 102 back into the operator compartment 16 of the skid steer loader 10, allowing the operator more room to turn around and exit. Rotating the armbars 92 upwards also activates armbar switch 98, engaging the parking brake.

Several advantages over the prior art may be associated with the adjustable operator interface 1. The disclosed armrest assemblies 40, 42 may allow for an operator to more easily enter or exit the operator compartment 16. The armrest assemblies 40, 42 may also allow an operator to ergonomically position the armbars 92.

Other aspects, objects and advantages of this invention can be obtained from a study of the drawings, the disclosure, and the appended claims.

What is claimed is:

1. An adjustable operator interface for a work machine having an operator compartment with a forward direction, comprising:
    a seat secured within the operator compartment;
    a mounting plate adjacent the seat and secured within the operator compartment;
    an armbar bracket slidably disposed along the forward direction on the mounting plate; and
    an armbar pivotally attached to the armbar bracket.
2. The adjustable operator interface of claim 1 further comprising:
    a slide assembly having a fixed bracket and a sliding bracket, wherein the fixed bracket is attached to the mounting plate and the sliding bracket is attached to the armbar bracket.
3. The adjustable operator interface of claim 2, wherein the slide assembly includes a pivot assembly pivotally mounted to the sliding bracket, the pivot assembly having a pivot arm with a handle end and a locking end, and wherein the pivot arm is biased about a pivot so that the locking end engages the fixed bracket.
4. The adjustable operator interface of claim 1 further comprising:
    a control lever supported by the armbar bracket.
5. The adjustable operator interface of claim 1 further comprising:
    a suspension system attached to the operator compartment and supporting the seat.
6. The adjustable operator interface of claim 1 further comprising:
    an armbar switch connected to the armbar.
7. The adjustable operator interface of claim 1, wherein the seat is fixedly attached to a floor of the operator compartment.
8. The adjustable operator interface of claim 1, wherein the mounting plate has a slot, and the armbar bracket is slidably disposed along the slot.
9. The adjustable operator interface of claim 1, wherein the mounting plate is attached to the seat.
10. The adjustable operator interface of claim 3, wherein the handle end of the pivot arm is configured to conform to a curve in the armbar.
11. A skid steer loader comprising:
    an operator compartment with a forward direction;
    a seat mounted within the operator compartment;
    a mounting plate adjacent the seat and secured within the operator compartment;
    an armbar bracket slidably disposed along the forward direction on the mounting plate; and
    an armbar pivotally attached to the armbar bracket.
12. The skid steer loader of claim 11 further comprising:
    a slide assembly having a fixed bracket and a sliding bracket, wherein the fixed bracket is attached to the mounting plate and the sliding bracket is attached to the armbar bracket.
13. The skid steer loader of claim 12, wherein the slide assembly includes a pivot assembly pivotally mounted to the sliding bracket, the pivot assembly having a pivot arm with a handle end and a locking end, and wherein the pivot arm is biased about a pivot so that the locking end engages the fixed bracket.
14. The skid steer loader of claim 11 further comprising:
    a suspension system attached to the operator compartment and supporting the seat.
15. The skid steer loader of claim 11 further comprising:
    an armbar switch connected to the armbar.
16. The skid steer loader of claim 11, wherein the seat is fixedly attached to a floor of the operator compartment.
17. The skid steer loader of claim 11, wherein the mounting plate has a slot, and the armbar bracket is slidably disposed along the slot.
18. The skid steer loader of claim 11, wherein the mounting plate is attached to the seat.
19. The skid steer loader of claim 11 further comprising:
    a control lever supported by the armbar bracket.
20. The skid steer loader of claim 13, wherein the handle end of the pivot arm is configured to conform to a curve in the armbar.
21. A method of providing an adjustable operator interface, including the steps of:
    providing a work machine having an operator compartment;
    securing a seat within the operator compartment;
    securing a mounting plate adjacent the seat and within the operator compartment;
    slidably mounting an armbar bracket on the mounting plate; and
    pivotally attaching an armbar to the armbar bracket.
22. The method of providing an adjustable operator interface of claim 21, further comprising the steps of:
    providing a slide assembly having a fixed bracket and a sliding bracket;
    attaching the fixed bracket to the mounting plate; and
    attaching the sliding bracket to the armbar bracket.
23. The method of providing an adjustable operator interface of claim 22, wherein the slide assembly includes a pivot assembly having a pivot arm with a handle end and a locking end and further comprising the steps of:
    pivotally mounting the pivot assembly to the sliding bracket; and
    biasing the pivot arm about a pivot so that the locking end engages the fixed bracket.
24. The method of providing an adjustable operator interface of claim 21, further comprising the steps of:
    providing a control lever;
    mounting the control lever to the armbar bracket; and
    attaching the mounting plate to the seat.

* * * * *